(12) United States Patent
Alton et al.

(10) Patent No.: US 10,609,053 B2
(45) Date of Patent: Mar. 31, 2020

(54) SUSPICIOUS NETWORK TRAFFIC IDENTIFICATION METHOD AND APPARATUS

(71) Applicant: INTEL CORPORATION, Santa Clara, CA (US)

(72) Inventors: Michael R. Alton, Portland, OR (US); Grant Babb, Portland, OR (US); Alan D. Ross, Shingle Springs, CA (US)

(73) Assignee: Intel Corporation, Santa Clara, CA (US)

( * ) Notice: Subject to any disclaimer, the term of this patent is extended or adjusted under 35 U.S.C. 154(b) by 571 days.

(21) Appl. No.: 15/085,730

(22) Filed: Mar. 30, 2016

(65) Prior Publication Data

US 2017/0149812 A1    May 25, 2017

Related U.S. Application Data

(60) Provisional application No. 62/259,546, filed on Nov. 24, 2015.

(51) Int. Cl.
*H04L 29/06* (2006.01)
*G06N 20/00* (2019.01)
*G06N 7/00* (2006.01)

(52) U.S. Cl.
CPC ......... *H04L 63/1425* (2013.01); *G06N 7/005* (2013.01); *G06N 20/00* (2019.01)

(58) Field of Classification Search
CPC .......................... H04L 63/1425; G06N 99/005
See application file for complete search history.

(56) References Cited

U.S. PATENT DOCUMENTS

| 7,412,722 | B1 | 8/2008 | Norris et al. | |
| 8,261,346 | B2 | 9/2012 | Riordan | |
| 8,347,394 | B1 | 1/2013 | Lee | |
| 9,077,744 | B2* | 7/2015 | Beutel | H04L 63/1416 |
| 9,432,389 | B1* | 8/2016 | Khalid | H04L 63/1425 |
| 2005/0022010 | A1* | 1/2005 | Swander | H04L 63/0218 726/4 |
| 2007/0239999 | A1 | 10/2007 | Honig et al. | |
| 2011/0314017 | A1* | 12/2011 | Yariv | G06Q 30/02 707/737 |

(Continued)

FOREIGN PATENT DOCUMENTS

EP    2530874 A1    12/2012

OTHER PUBLICATIONS

Newton, "Anomaly Detection in Network Traffic Traces Using Latent Dirichlet Allocation", COMP 790-124—Machine Learning, Final Project, Dec. (Year: 2012).*

(Continued)

*Primary Examiner* — Morshed Mehedi
(74) *Attorney, Agent, or Firm* — Schwabe, Williamson & Wyatt, P.C.

(57) ABSTRACT

Apparatuses, methods and storage medium associated with techniques to identify suspicious network connections. In embodiments, an apparatus may include an analysis function to be operated by the one or more processors to receive a collection of network data records, and apply a latent factor model to the network data records to identify a subset of the network data records as suspicious network connections. Other embodiments may be disclosed or claimed.

24 Claims, 6 Drawing Sheets

(56) References Cited

U.S. PATENT DOCUMENTS

| | | | | |
|---|---|---|---|---|
| 2012/0284791 A1* | 11/2012 | Miller | .................. | G06F 21/554 |
| | | | | 726/22 |
| 2013/0073485 A1* | 3/2013 | Sathish | ................. | G06Q 30/02 |
| | | | | 706/12 |
| 2013/0081099 A1* | 3/2013 | Sathish | .............. | G06F 21/6245 |
| | | | | 726/1 |
| 2014/0025673 A1* | 1/2014 | Sinha | .................. | G06Q 10/101 |
| | | | | 707/732 |
| 2014/0165195 A1* | 6/2014 | Brdiczka | .............. | G06F 21/552 |
| | | | | 726/23 |
| 2015/0067849 A1* | 3/2015 | Agrawal | ................. | G06F 21/56 |
| | | | | 726/23 |
| 2016/0110646 A1* | 4/2016 | Somekh | .................. | G06N 5/04 |
| | | | | 706/46 |
| 2016/0219068 A1* | 7/2016 | Lee | .................. | G06F 17/30598 |
| 2017/0032266 A1* | 2/2017 | Gopalakrishnan | ....... | G06N 5/02 |
| 2017/0149830 A1* | 5/2017 | Kim | .................. | H04L 63/1425 |

OTHER PUBLICATIONS

Maheshwari et al., "Detecting Wormhole Attacks in Wireless Networks Using Connectivity Information", IEEE INFOCOM 2007—26th IEEE International Conference on Computer Communications, Date of Conference: May 6-12 (Year: 2007).*
International Search Report and Written Opinion dated Jan. 3, 2017 for International Application No. PCT/US2016/052947, 15 pages.

* cited by examiner

SUSPICIOUS NETWORK TRAFFIC IDENTIFICATION METHOD AND APPARATUS

RELATED APPLICATION

This application is a non-provisional application of U.S. provisional application 62/259,546, entitled "Suspicious Network Traffic Identification Method and Apparatus," filed on Nov. 24, 2015. The Specification of U.S. provisional application 62/259,546 is hereby fully incorporated by reference.

TECHNICAL FIELD

The present disclosure relates to the fields of networking and computing. In particular, the present disclosure is related to method and apparatus for identifying suspicious network traffic.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Most approaches to detecting network threats take a rules and/or supervised learning approach based approach. As such, they are narrowly focused on specific use cases or on identifying specific types of attacks and can fail to adapt to new or changing threats. Rules-based approaches often miss "low and slow" attacks that are able to unfold without triggering specific rules. Supervised learning approaches often suffer from a lack of labelled examples, instead relying on simulated data to learn models. Such approaches can have both high false positive rates as well as a high number of false negatives.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Technology described herein provides for method and apparatus for identifying unusual or anomalous activity in networks by utilizing latent factor models on network data (such as NetFlow, SFlow. JFlow, DNS records, packet capture data, etc.), heuristics, and user feedback. The technology allows analysts to sift through previously unmanageable volumes of data to identify specific connections and patterns of network traffic that are of interest. Finding anomalous network activity may be useful in a wide variety of applications. For example, in the context of network security, anomalous connections may indicate malicious attacks, network intrusion or data exfiltration. In electronic trading, such as stock or commodities exchanges, unusual activity may signal unauthorized trading. Anomalous network traffic in electrical grids could signal potential maintenance issues such as improperly installed generators, unexpected spikes in usage, tampered meters or even terrorist attacks. (DNS=Domain Name System.)

In the description to follow, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Operations of various methods may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiments. Various additional operations may be performed and/or described operations may be omitted, split or combined in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used hereinafter, including the claims, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
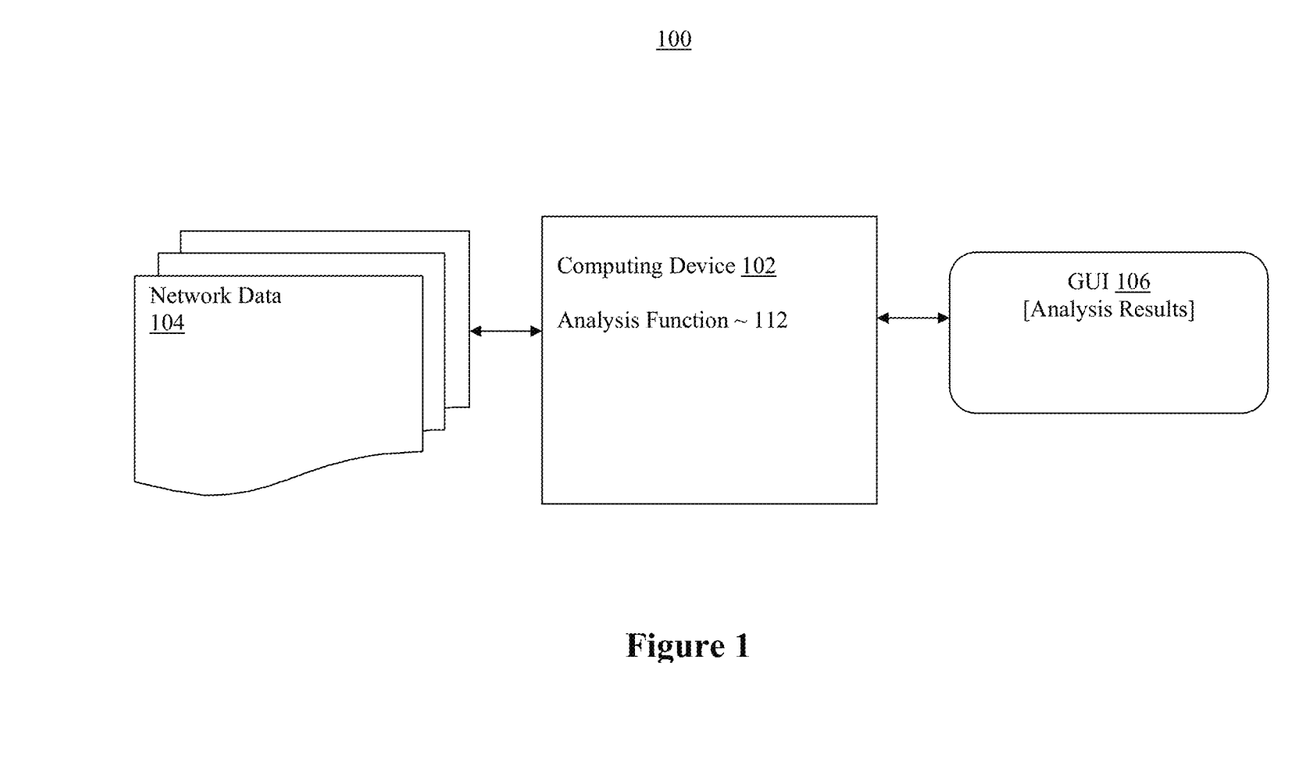
FIG. 1 illustrates an overview of a computing environment of the present disclosure, in accordance with various embodiments.

Referring now to FIG. 1, wherein an overview of a computing environment of the present disclosure, in accordance with various embodiments, is shown. As illustrated, computing environment 100 may include a computing device 102 having an analysis function 112 incorporated with the suspicious network traffic identification technology of the present disclosure. Computing device 102 may be provided with a large collection of network flows records 104. Network flow records 104 may summarize information about communications on a network of interest or may provide detailed information about communications over a specific network protocol. Analysis function 112 configured with suspicious network traffic identification technology of the present disclosure may analyze network flows records 104, and provide an overview of how the network is functioning and provide warnings about anomalous traffic, which may indicate potential risks. As will be described in more detail below, in embodiments, analysis function 112 may first perform a machine learning process, followed by an analytic process. Further, analysis function 112 may use a latent factor model to generate a probabilistic model for network traffic and assign a likelihood score to each connection indicating the likelihood of a particular device sending or receiving a given connection from/to another device on the network.

In embodiments, results of the analysis may be provided to the analysts in a graphical user interface (GUI). The analysts may interact with the GUI, view, sort, filter as well as auto-evaluate results using user specified rules (e.g.: ignore all results on port 123 between 2:30 pm and 4:00 pm originating from a particular IP address) to identify suspicious network traffics. The GUI may be presented to an analyst on a display device of computing device 102 or a client device (not shown) networked with computing device 102.

In embodiments, computing device 102 may be a computing tablet, a laptop computer, a desktop computer, a server on a network or a server in the cloud. Network flows records 104 may be records of network traffic of any public and/or private networks, local or wide area, wired and/or wireless. Similarly, a networked client device for presenting and interacting with the GUI may be a wearable device, a smartphone, a personal digital assistant, a computing tablet, a laptop computer, or a desktop computer. The client device may be networked with computing device 102 via any public and/or private networks, local or wide area, wired and/or wireless.

Figure 2:
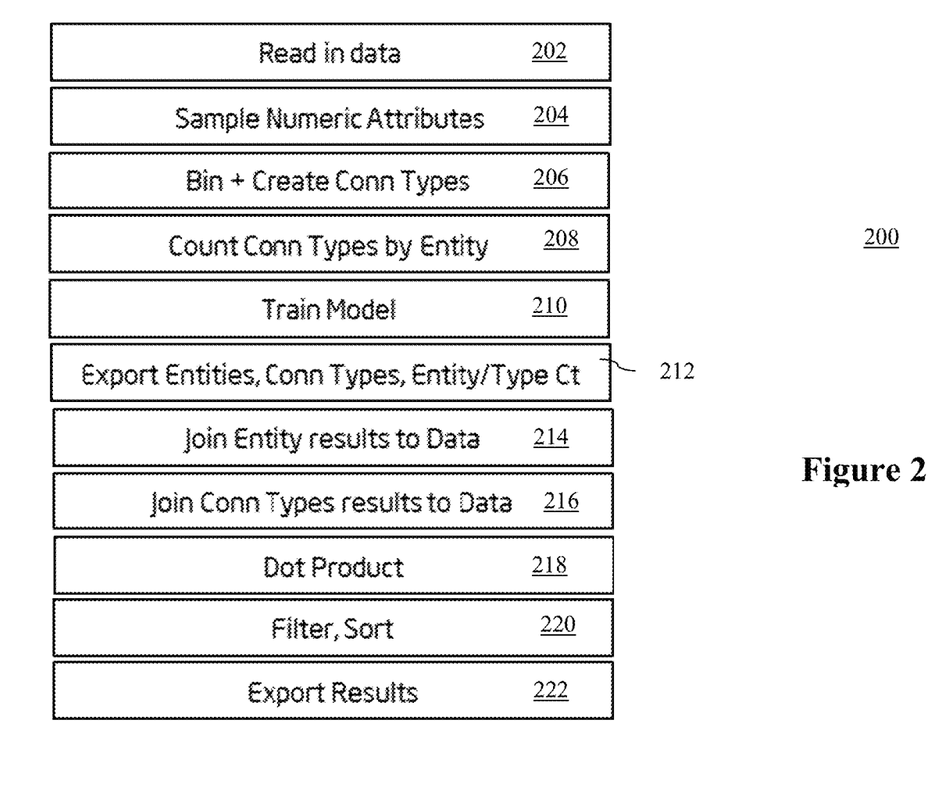
FIG. 2 illustrates an example machine learning process, according to some embodiments.

Referring now to FIG. 2, wherein an example machine learning process, according to some embodiments, is shown. As illustrated, machine learning process 200 may start at 202 where the network flows records are read in, then at 204, the network flows records numeric attributes sampled.

Thereafter, at 206 and 208, each record of network data may be bucketed into discrete connection types. Connections types may be created by binning and clustering salient features of the connection and/or features of the devices involved in the connection. As an example, a download consisting of a number of bytes between 128 and 600 bytes, a number of packets between 2 and 6, between 2:10 pm and 3:20 pm on port 80 might be one type of connection. Connection types may also involve properties of the devices involved, for example the type of connection might depend on whether one or both of the devices was internal or external, had a static or dynamic IP address, belonged to a particular user group or white list, etc.

A single network record may be counted as multiple connections of different types and the types may differ for different devices involved in the communication. For example, every network flow may be both an upload and a download. In applications where the direction of traffic is important, each connection might be counted as one upload connection type for the source device and one download connection type for the destination device. Similarly, in network records from DNS protocol, a connection may be a client query or a server answer.

The number of potential connections types can be very large, often millions of potential types are created. For each IP address and/or device, the number of times each type of connection is observed in a given period may be counted to form a sparse matrix of connections counts by type and device. The matrix is then factored into a d×k device matrix, F, and a k×w connections matrix, W, where d is the number of devices being analyzed, w the number of connection types and k is the number of latent factors being used. The probability of a device being involved in a particular connection is modeled as: $P(Device_i, connectiontype_k)=F_i*W_k+b_i+b_k$, where $F_i$ is a 1×k vector of factor weights for device i, $W_k$ is a k×1 vector of factor weights for connection type k and $b_i$, and $b_k$ are biases for device i and connection type k respectively, which may be zero.

At 210, the latent factor model may be formed using the above information. Further, the latent factor model may be trained and scored on each day individually, providing analysis with a forensic analysis of the day's events. Alternately, data may be aggregated over many days and used to score subsequent network activity.

Once a model is fit, scoring may run in linear time. The device and word matrices can be stored and used to calculate likelihood scores of new records either in near-real time as they are observed or in batch. At 212 the entities, connection types and entity/connection type counts may be exported for further analysis and/or visualization. At 214 and 216, the entity and connection types may be joined with the network data. At 218 and 220, the computation (e.g., a dot product) may be performed, filtered and sorted. At 222, the results may be exported for use by analysts.

Feedback from analysts in the form of scored records can be incorporated back into the model. Connections labelled as false positives are duplicated many times in the training data in order to help the model learn that these connections are a part of the normal behavior of the devices involved. Additionally, connections labelled as true positives may be down sampled in future trainings. The model is then refit on the original training data plus the duplicated records minus any down sampled records if any. In this way, the model is able to improve and adapt over time through periodic refitting.

Figure 3:
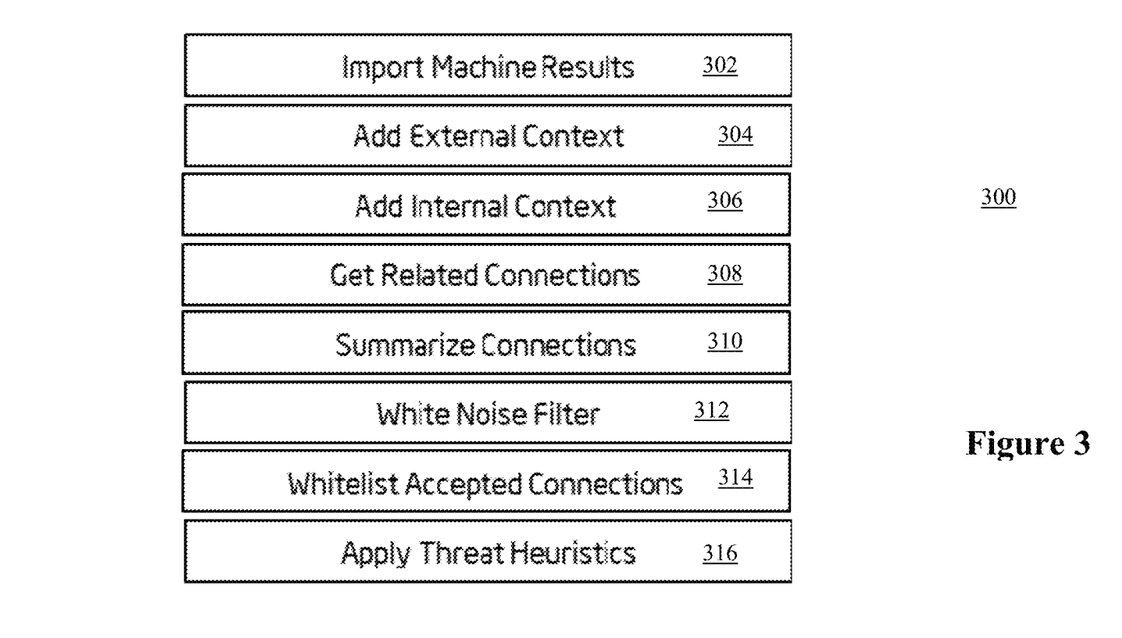
FIG. 3 illustrates an example analytic process, according to some embodiments.

After the machine learning operation have reduced a very large network records dataset (billions) to a smaller subset of rare, very low probability connections, the subset may be run through an operational analytics pipeline, using analysis function 112. The analytics pipeline may aid interpretation of the machine learning data and highlight the most interesting patterns in the filtered subset. FIG. 3 illustrates an example analytics pipeline, in accordance with some embodiments.

As shown, on import of the machine learning results, 302, the next operations in the pipeline may include operations that add internal and external contexts, 304 and 306, such as physical or logical location and ownership of the IP address. The next operations, 308 and 310, may select and summarize connections that are relevant to the time that each suspicious connection was made. Next, 312, a noise filter may be applied. A noise filter may filter connections with very low frequencies (e.g.: singletons) or isolated connections meeting predefined criteria e.g.: connections on uncommonly used ports and/or with minimal byte sizes. In embodiments, the noise filter may be configurable. The noise filter may assist in removing random, unrelated connections, which are not part of a network of connections. At 314, a whitelist or set of heuristic rules that define acceptable patterns of connection in a network, regardless of frequency or unusual pattern may be applied. Then, at 316, a separate set of heuristic rules that assist in identifying interesting patterns in the data may be applied, such as rules that have been known to correspond to security threats. Examples may include, but are not limited to, external IP addresses with a large number of unusual connections, IP addresses with the same owner, IP addresses that are part of a the same geographic entity.

Figure 4:
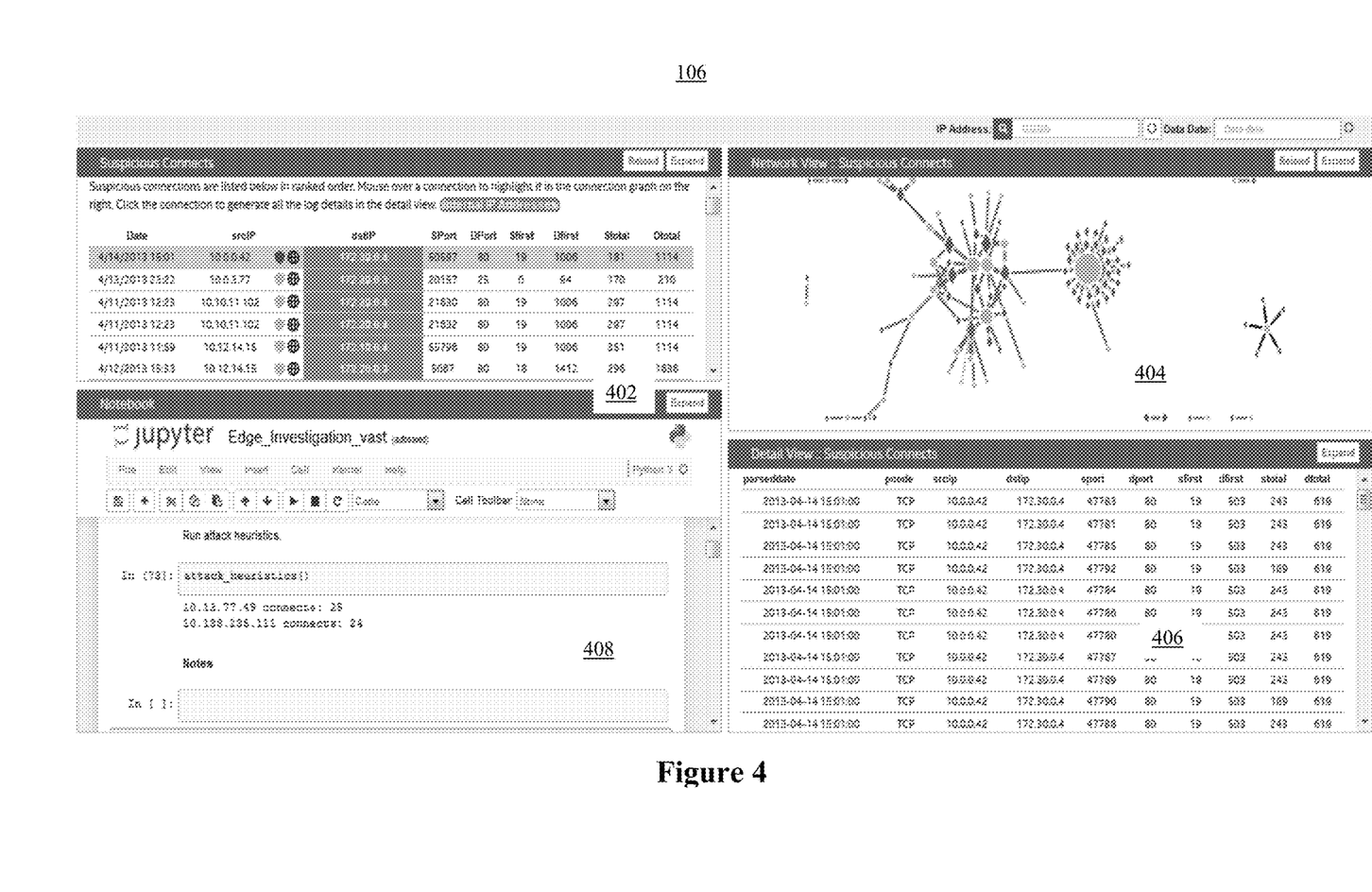
FIG. 4 illustrates an example graphical user interface, according to some embodiments.

FIG. 4 illustrates an example GUI for presenting the analysis results to analyst and interaction with the analyst, according to some embodiment. As shown, for the example embodiments, GUI 106 may include a number of windows in any instance. In the example instance, GUI 106 may include 4 windows. Going clockwise, top left window 402 may display a summary view of a subset of the small set of suspicious connection culled from the large volume of network flows records. Top right window 404 may display a graphical representation of the suspicious connections. Bottom right window 406 may display a detailed view of the suspicious connections. Bottom left window 408 may display an interactive programming environment, such as a Jupyter, Zeppelin or iPython notepad containing an expanded view with even more details on suspicious connections selected among the suspicious connections listed in either top left window 402 or bottom right window 406. Users may additionally use the interactive programming environment to define user generated rules for identifying anomalous connections.

unlikely to occur between a billing server and an electrical substation. This also means that it is particularly difficult for network intruders to fool the system if they are unfamiliar with a compromised device's normal functionality.

Further, the disclosed technology has been found to have a relatively high level of accuracy in detecting network security threats. The methodology was applied to a sample of 8 days of external NetFlow data. After scoring each connection during the day with a likelihood score, the top 3,000 results per day were presented to network security analysts using the earlier described GUI. The analysts were able to quickly view, sort, filter as well as auto-evaluate results using user specified rules (e.g.: ignore all results on port 123 between 2:30 pm and 4:00 pm originating from a particular IP address). This ability to filter with rules resulted in not all connections being manually evaluated as shown by the evaluation rates in the table below. Connections that analysts did manually evaluate, were labelled as Confirmed Risks, Possible Threats, such as unsuccessful port scan activity, or Not a Threat. Accuracy, shown in the table below was defined as the percentage of evaluated results that were either Confirmed Threats or Possible Threats. Analysts were able to consistently achieve 90+ percent accuracy in identifying threats.

| | Date | | | | | | | | |
|---|---|---|---|---|---|---|---|---|---|
| Severity | Apr. 16, 2015 | Apr. 17, 2015 | Apr. 18, 2015 | Apr. 19, 2015 | Apr. 20, 2015 | Apr. 21, 2015 | Apr. 22, 2015 | Apr. 23, 2015 | Grand Total |
| Not Evaluated | 87 | 2101 | 2367 | 1965 | 2036 | 1873 | 1994 | 2316 | 14739 |
| Confirmed Risk | 14 | 250 | 161 | 325 | 304 | 100 | 121 | 531 | 1806 |
| Possible Threat | 3 | 590 | 451 | 710 | 642 | 1044 | 711 | 26 | 4177 |
| Not a Threat | 3 | 41 | 27 | 12 | 12 | 53 | 77 | 53 | 278 |
| Grand Total | 107 | 2982 | 3006 | 3012 | 2994 | 3070 | 2903 | 2926 | 21000 |
| Evaluation Rate | 18.69% | 29.54% | 21.26% | 34.76% | 32.00% | 38.99% | 31.31% | 20.85% | 29.81% |
| Accuracy | 85.00% | 95.35% | 95.77% | 98.85% | 98.75% | 95.57% | 91.53% | 91.31% | 95.56% |

In embodiments, the GUI, in addition to enabling an analyst to quickly view the information, may also allow the analyst to sort, filter as well as auto-evaluate results using user specified rules (e.g.: ignore all results on port X between Time1 and Time2 originating from a particular IP address). This ability to filter with rules resulted in not all connections having to be manually evaluated by the analyst, and further improve the efficiency, and in the end, the effectiveness in uncovering suspicious connection from the huge volume of network flows records.

Thus, an improved method and apparatus for identifying suspicious network traffic has been described.

In contrast with the prior art, the disclosed technology takes an unsupervised learning approach, which learns the normal behavior of each device on the network and assesses the likelihood of new connections given the typical behavior of the devices involved in that conversation. The disclosed approach is more adaptable to new types of threats because the model does not have to have seen a particular type before in order to label it suspicious. Because the likelihood of connections is assessed relative to each device's normal behavior, the disclosed technology is able to flag common and seemingly benign connections as anomalous based on the participants of the connection. For example, a connection on a specific port number that is extremely common between an electric meter and a billing server, and hence may be over looked by other approaches, may be extremely Referring now to FIG. 5, wherein a block diagram of an example architecture of a computing device suitable for use as computing device 102 of the present disclosure, in accordance with various embodiments, is illustrated. As shown, computing device 600 may include one or more processors or processor cores 602, and persistent memory 604. In embodiments, multiples processor cores 602 may be disposed on one die. For the purpose of this application, including the claims, the terms "processor" and "processor cores" may be considered synonymous, unless the context clearly requires otherwise. Additionally, computing device 600 may include communication interfaces 610, such as, Ethernet, WiFi, Bluetooth, 3G/4G and so forth, and I/O device 608 may include cameras, display devices, keyboard, cursor control and so forth. The elements may be coupled to each other via system bus 606, which may represent one or more buses. In the case of multiple buses, they may be bridged by one or more bus bridges (not shown).

Figure 5:
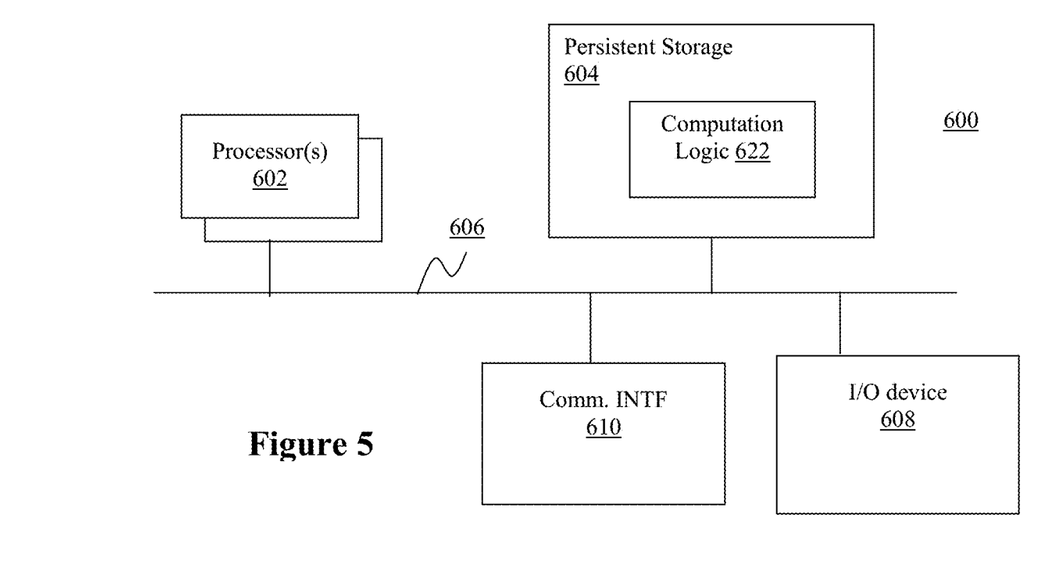
FIG. 5 illustrates a block diagram of example architecture of a computing device suitable for use to practice the present disclosure, in accordance with various embodiments.

Each of these elements may perform its conventional functions known in the art. In particular, persistent memory 604 may be employed to store a copy of computing logic 622 implementing the operations described earlier, e.g., but not limited to, analysis function 112. Computing logic 622 may be implemented in assembler instructions supported by processor(s) 602 or high-level languages, such as, for example, C or a scripting language, which can be compiled into such instructions. The programming instructions may be placed into persistent memory 604 in the factory, or in the field, through, for example, a distribution medium (not shown), such as a compact disc (CD), or through communication interface 610 (from a distribution server (not shown)). The number, capability and/or capacity of these elements 602-610 may vary from embodiments to embodiments and/or depending on whether computing device 600 is used as client 102 or server 106. The constitutions of these elements 602-610 are otherwise known, and accordingly will not be further described.

Figure 6:
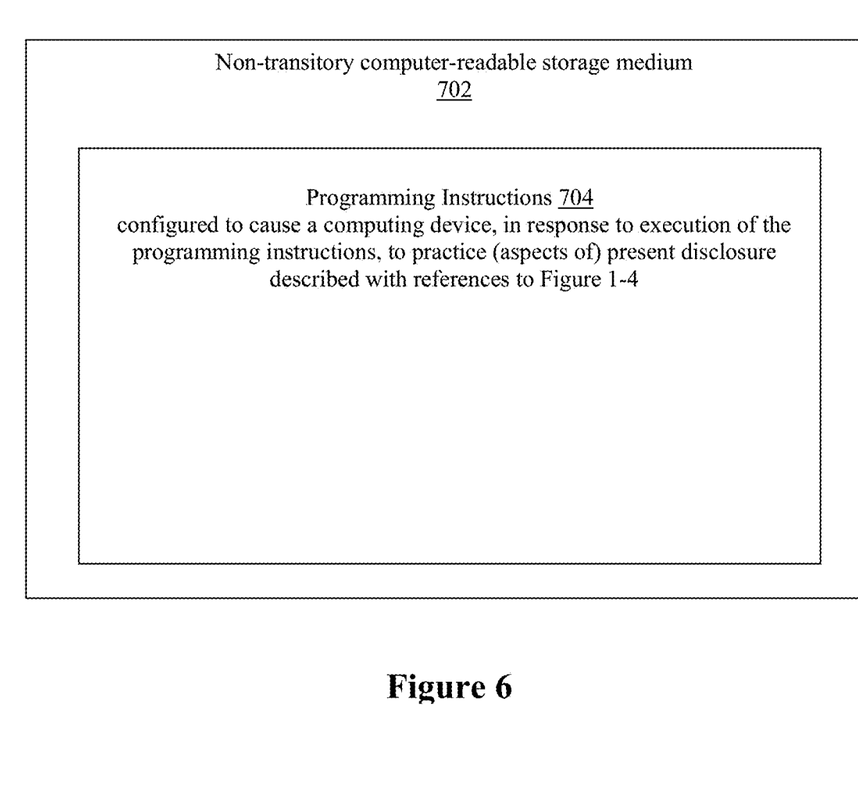
FIG. 6 illustrates an example computer-readable storage medium with instructions configured to enable a computing device to practice aspects of the present disclosure, in accordance with various embodiments.

FIG. 6 illustrates an example non-transitory computer-readable storage medium having instructions configured to practice all or selected ones of the operations associated with analysis function 112, earlier described, in accordance with various embodiments. As illustrated, non-transitory computer-readable storage medium 702 may include a number of programming instructions 704. Programming instructions 704 may be configured to enable a device, e.g., computing device 102, in response to execution of the programming instructions, to perform various operations of analysis function 112 earlier described. In alternate embodiments, programming instructions 704 may be disposed on multiple non-transitory computer-readable storage media 702 instead. In still other embodiments, programming instructions 704 may be encoded in transitory computer readable signals. The programming instruction may also include piece of software that protects or encrypts the data in the memory, storage, data being processed, and in communication channel being exposed to the hackers.

Referring back to FIG. 5, for one embodiment, at least one of processors 602 may be packaged together with a computer-readable storage medium having computing 622 (in lieu of storing in system memory 604) configured to practice all or selected aspects of sensor hub operations. For one embodiment, at least one of processors 602 may be packaged together with a computer-readable storage medium having computing logic 622 to form a System in Package (SiP). For one embodiment, at least one of processors 602 may be integrated on the same die with a computer-readable storage medium having computing logic 622. For one embodiment, at least one of processors 602 may be packaged together with a computer-readable storage medium having computing logic 622 to form a System on Chip (SoC).

Thus various example embodiments of the present disclosure have been described including, but are not limited to:

Example 1 may be an apparatus for identifying suspicious network connections, comprising: one or more processor; and an analysis function to be operated by the one or more processors to receive a collection of network data records, and apply a latent factor model to the data to identify a subset of the network data records as suspicious network connections.

Example 2 may be example 1, wherein the analysis function may further train the latent factor model.

Example 3 may be example 2, wherein to train the latent factor model, the analysis function may identify connection types, and bin the network data records by connection types.

Example 4 may be example 1, wherein to identify a subset of the network data records as suspicious network connections, the analysis function may further use the latent factor model to generate a probabilistic model for network traffic and assign a likelihood score to each connection indicating a likelihood of a particular device sending or receiving a given connection from/to another device on the network.

Example 5 may be example 4, wherein to generate the probabilistic model, the analysis function may form a sparse matrix of connections counts by type and device, based at least in part on a count of the number of times each type of connection is observed, for each IP address, in a given time period.

Example 6 may be example 5, wherein the analysis function may further factor the sparse matrix into a d×k device matrix, F, and a k×w connections matrix, W, where d is the number of devices being analyzed, w the number of connection types and k is the number of latent factors being used.

Example 7 may be example 6, wherein the analysis function may further compute a plurality of probabilities, one for each device, being involved in a particular connection as: $P(Device_i, connectiontype_k) = F_i * W_k + b_i + b_k$, where $F_i$ is a 1×k vector of factor weights for device i, $W_k$ is a k×1 vector of factor weights for connection type k and $b_i$ and $b_k$ are biases for device i and connection type k respectively.

Example 8 may be any one of examples 1-7, wherein the analysis function may further output the identified suspicious network connections in a graphical user interface (GUI) for analysis by an analyst.

Example 9 may be example 8, wherein the analysis function may further filter or sort the identified suspicious network connections, in response to instructions from the analyst via the GUI.

Example 10 may be example 8, wherein the analysis function may further train the latent factor model based on feedback from the analyst.

Example 11 may be a method for identifying suspicious network connections, comprising: receiving, by a computing device, a collection of network data records; and applying, by the computing device, a latent factor model to the data to identify a subset of the network data records as suspicious network connections.

Example 12 may be example 11, further comprising training the latent factor model.

Example 13 may be example 12, wherein training the latent factor model may comprise identifying connection types, and binning the network data records by connection types.

Example 14 may be example 11, wherein applying may comprise generating, using the latent factor model, a probabilistic model for network traffic and assigning a likelihood score to each connection indicating a likelihood of a particular device sending or receiving a given connection from/to another device on the network.

Example 15 may be example 14, wherein generating the probabilistic model may comprise forming a sparse matrix of connections counts by type and device, based at least in part on a count of the number of times each type of connection is observed, for each IP address, in a given time period.

Example 16 may be example 15, wherein generating the probabilistic model may further comprise factoring the sparse matrix into a d×k device matrix, F, and a k×w connections matrix, W, where d is the number of devices being analyzed, w the number of connection types and k is the number of latent factors being used.

Example 17 may be example 16, wherein generating the probabilistic model may further comprise computing a plurality of probabilities, one for each device, being involved in a particular connection as: $P(Device_i, connectiontype_k) = F_i * W_k + b_i + b_k$, where $F_i$ is a 1×k vector of factor weights for device i, $W_k$ is a k×1 vector of factor weights for connection type k and $b_i$ and $b_k$ are biases for device i and connection type k respectively.

Example 18 may be any one of examples 11-17, further comprising outputting, by the computing device, the identified suspicious network connections in a graphical user interface (GUI) for analysis by an analyst.

Example 19 may be example 18, further comprising filtering or sorting, by the computing device, the identified suspicious network connections, in response to instructions from the analyst via the GUI.

Example 20 may be example 18, further comprising training the latent factor model based on feedback from the analyst.

Example 21 may be one or more computer-readable storage medium (CRM) having instructions to cause a computing device, in response to execution of the instructions by the computing device, to implement an analysis function to: receive a collection of network data records; and apply a latent factor model to the data to identify a subset of the network data records as suspicious network connections.

Example 22 may be example 21, wherein the analysis function may further train the latent factor model.

Example 23 may be example 22, wherein to train the latent factor model, the analysis function may identify connection types, and bin the network data records by connection types.

Example 24 may be example 21, wherein to identify a subset of the network data records as suspicious network connections, the analysis function may further use the latent factor model to generate a probabilistic model for network traffic and assign a likelihood score to each connection indicating a likelihood of a particular device sending or receiving a given connection from/to another device on the network.

Example 25 may be example 24, wherein to generate the probabilistic model, the analysis function may form a sparse matrix of connections counts by type and device, based at least in part on a count of the number of times each type of connection is observed, for each IP address, in a given time period.

Example 26 may be example 25, wherein the analysis function may further factor the sparse matrix into a d×k device matrix, F, and a k×w connections matrix, W, where d is the number of devices being analyzed, w the number of connection types and k is the number of latent factors being used.

Example 27 may be example 26, wherein the analysis function may further compute a plurality of probabilities, one for each device, being involved in a particular connection as: $P(Device_i, connectiontype_k)=F_i*W_k+b_i+b_k$, where $F_i$ is a 1×k vector of factor weights for device i, $W_k$ is a k×1 vector of factor weights for connection type k and $b_i$ and $b_k$ are biases for device i and connection type k respectively.

Example 28 may be any one of examples 21-27, wherein the analysis function is further output the identified suspicious network connections in a graphical user interface (GUI) for analysis by an analyst.

Example 29 may be example 28, wherein the analysis function may further filter or sort the identified suspicious network connections, in response to instructions from the analyst via the GUI.

Example 30 may be example 28, wherein the analysis function may further train the latent factor model based on feedback from the analyst.

Example 31 may be an apparatus for identifying suspicious network connections, comprising: means for receiving a collection of network data records; and means for applying a latent factor model to the data to identify a subset of the network data records as suspicious network connections.

Example 32 may be example 31, further comprising means for training the latent factor model.

Example 33 may be example 32, wherein means for training the latent factor model may comprise means for identifying connection types, and binning the network data records by connection types.

Example 34 may be example 31, wherein means for applying may comprise means for using the latent factor model to generate a probabilistic model for network traffic and means for assigning a likelihood score to each connection indicating a likelihood of a particular device sending or receiving a given connection from/to another device on the network.

Example 35 may be example 34, wherein means for using the latent factor model to generate the probabilistic model may comprise means for forming a sparse matrix of connections counts by type and device, based at least in part on a count of the number of times each type of connection is observed, for each IP address, in a given time period.

Example 36 may be example 35, wherein means for using the latent factor model to generate the probabilistic model may further comprise means for factoring the sparse matrix into a d×k device matrix, F, and a k×w connections matrix, W, where d is the number of devices being analyzed, w the number of connection types and k is the number of latent factors being used.

Example 37 may be example 36, wherein means for using the latent factor model to generate the probabilistic model may further comprise means for computing a plurality of probabilities, one for each device, being involved in a particular connection as: $P(Device_i, connectiontype_k)=F_i*W_k+b_i+b_k$, where $F_i$ is a 1×k vector of factor weights for device i, $W_k$ is a k×1 vector of factor weights for connection type k and $b_i$ and $b_k$ are biases for device i and connection type k respectively.

Example 38 may be any one of examples 31-37, further comprising means for outputting the identified suspicious network connections in a graphical user interface (GUI) for analysis by an analyst.

Example 39 may be example 38, further comprising means for filtering or sorting the identified suspicious network connections, in response to instructions from the analyst via the GUI.

Example 40 may be example 38, further comprising means for training the latent factor model based on feedback from the analyst.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. An apparatus for identifying suspicious network connections, comprising:
   one or more computer processors; and
   an analysis function to be operated by the one or more computer processors to receive a collection of network flow records that include information about communications on a network or communications over a network protocol, a first portion of the collection of network flow records not having information of suspicious network connections, and a second portion of the collection of network flow records having information of suspicious network connections, and apply a latent factor model to the network flow records to identify the second portion of the collection of network flow records as having information of suspicious network connections;
   wherein to identify the second portion of the network flow records as suspicious network connections, the analysis function is further to use the latent factor model to generate a probabilistic model for network traffic, by forming a sparse matrix of connections counts by type based at least in part on non-address features of the connection and/or non-address features of devices.

2. The apparatus of claim 1, wherein the analysis function is further to train the latent factor model.

3. The apparatus of claim 2, wherein to train the latent factor model, the analysis function is to identify connection types, and bin the network flow records by connection types.

4. The apparatus of claim 1, wherein to identify the second portion of the network flow records as suspicious network connections, the analysis function is further to use the latent factor model to further assign a likelihood score to each connection indicating a likelihood of a particular device sending or receiving a given connection from/to another device on the network.

5. The apparatus of claim 4, wherein forming a sparse matrix of connections counts by type and device is based at least in part on a count of a number of times each type of connection is observed, for each IP address, in a given time period.

6. The apparatus of claim 5, wherein the analysis function is to further factor the sparse matrix into a d×k device matrix, F, and a k×w connections matrix, W, where d is a number of devices being analyzed, w is a number of connection types and k is a number of latent factors being used.

7. The apparatus of claim 6, wherein the analysis function is to further compute a plurality of probabilities, one for each device, being involved in a particular connection as: $P(Device_i, connectiontype_k) = F_i * W_k + b_i + b_k$, where $F_i$ is a 1×k vector of factor weights for device i, $W_k$ is a k×1 vector of factor weights for connection type k and $b_i$ and $b_k$ are biases for device i and connection type k respectively.

8. The apparatus of claim 1, wherein the analysis function is to further output the identified suspicious network connections in a graphical user interface (GUI) for analysis by an analyst.

9. The apparatus of claim 8, wherein the analysis function is to further filter or sort the identified suspicious network connections, in response to instructions from the analyst via the GUI.

10. The apparatus of claim 8, wherein the analysis function is to further train the latent factor model based on feedback from the analyst.

11. A method for identifying suspicious network connections, comprising:

receiving, by a computing device, a collection of network flow records that include information about communications on a network or communications over a network protocol, a first portion of the collection of network flow records not having information of suspicious network connections, and a second portion of the collection of network flow records having information of suspicious network connections; and
   applying, by the computing device, a latent factor model to data to identify the second portion of the network flow records as having information of suspicious network connections;
   wherein to identify the second portion of the network flow records as suspicious network connections comprises to use the latent factor model to generate a probabilistic model for network traffic, by forming a sparse matrix of connections counts by type based at least in part on non-address features of the connection and/or non-address features of devices.

12. The method of claim 11, further comprising training the latent factor model, wherein training the latent factor model comprises identifying connection types, and binning the network flow records by connection types.

13. The method of claim 11, wherein applying further comprises assigning a likelihood score to each connection indicating a likelihood of a particular device sending or receiving a given connection from/to another device on the network.

14. The method of claim 13, wherein forming a sparse matrix of connections counts by type and device is based at least in part on a count of a number of times each type of connection is observed, for each IP address, in a given time period; factoring the sparse matrix into a d×k device matrix, F, and a k×w connections matrix, W, where d is a number of devices being analyzed, w is a number of connection types and k is a number of latent factors being used; and computing a plurality of probabilities, one for each device, being involved in a particular connection as: $P(Device_i, connectiontype_k) = F_i * W_k + b_i + b_k$, where $F_i$ is a 1×k vector of factor weights for device i, $W_k$ is a k×1 vector of factor weights for connection type k and $b_i$ and $b_k$ are biases for device i and connection type k respectively.

15. The method of claim 11, further comprising outputting, by the computing device, the identified suspicious network connections in a graphical user interface (GUI) for analysis by an analyst.

16. The method of claim 15, further comprising filtering or sorting, by the computing device, the identified suspicious network connections, in response to instructions from the analyst via the GUI.

17. The method of claim 15, further comprising training the latent factor model based on feedback from the analyst.

18. One or more non-transitory computer-readable storage media (CRM) having instructions to cause a computing device, in response to execution of the instructions by the computing device, to implement an analysis function to:
   receive a collection of network flow records that include information about communications on a network or communications over a network protocol, a first portion of the collection of network flow records not having information of suspicious network connections, and a second portion of the collection of network flow records having information of suspicious network connections; and
   apply a latent factor model to data to identify a portion of the network flow records as having information of suspicious network connections;

wherein to identify the second portion of the network flow records as suspicious network connections comprises to use the latent factor model to generate a probabilistic model for network traffic, by forming a sparse matrix of connections counts by type based at least in part on non-address features of the connection and/or non-address features of devices.

19. The one or more non-transitory CRM of claim 18, wherein the analysis function is further to train the latent factor model; wherein to train the latent factor model, the analysis function is to identify connection types, and bin the network flow records by connection types.

20. The one or more non-transitory CRM of claim 19, wherein to identify the second portion of the network flow records as suspicious network connections, the analysis function is further to assign a likelihood score to each connection indicating a likelihood of a particular device sending or receiving a given connection from/to another device on the network.

21. The one or more non-transitory CRM of claim 20, wherein to form a sparse matrix of connections counts by type and device is based at least in part on a count of a number of times each type of connection is observed, for each IP address, in a given time period; factor the sparse matrix into a d×k device matrix, F, and a k×w connections matrix, W, where d is a number of devices being analyzed, w is a number of connection types and k is a number of latent factors being used; and compute a plurality of probabilities, one for each device, being involved in a particular connection as: $P(Device_i, connectiontype_k) = F_i * W_k + b_i + b_k$, where $F_i$ is a 1×k vector of factor weights for device i, $W_k$ is a k×1 vector of factor weights for connection type k and b and $b_k$ are biases for device i and connection type k respectively.

22. The one or more non-transitory CRM of claim 18, wherein the analysis function is further to output the identified suspicious network connections in a graphical user interface (GUI) for analysis by an analyst.

23. The one or more non-transitory CRM of claim 22, wherein the analysis function is to further filter or sort the identified suspicious network connections, in response to instructions from the analyst via the GUI.

24. The one or more non-transitory CRM of claim 22, wherein the analysis function is to further train the latent factor model based on feedback from the analyst.

* * * * *